(12) United States Patent
Murali et al.

(10) Patent No.: US 11,755,096 B2
(45) Date of Patent: *Sep. 12, 2023

(54) METHOD AND APPARATUS FOR SELECTABLE HIGH PERFORMANCE OR LOW POWER PROCESSOR SYSTEM

(71) Applicant: Silicon Laboratories Inc., Austin, TX (US)

(72) Inventors: Partha Sarathy Murali, Sunnyvale, CA (US); Suryanarayana Varma Nallaparaju, Vizianagaram (IN); Kriyangbhai Vinodbhai Shah, Bangalore (IN); Venkata Rao Gunturu, Hyderabad (IN); Subba Reddy Kallam, Sunnyvale, CA (US); Mani Kumar Kothamasu, Hyderabad (IN)

(73) Assignee: Silicon Laboratories Inc., Austin, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/395,311

(22) Filed: Aug. 5, 2021

(65) Prior Publication Data

US 2021/0365100 A1    Nov. 25, 2021

Related U.S. Application Data

(63) Continuation of application No. 16/599,587, filed on Oct. 11, 2019, now Pat. No. 11,112,849.

(60) Provisional application No. 62/751,464, filed on Oct. 26, 2018.

(51) Int. Cl.
| G06F 1/32 | (2019.01) |
| G06F 1/3237 | (2019.01) |
| G06F 1/3296 | (2019.01) |
| H04W 52/02 | (2009.01) |
| G06F 1/3209 | (2019.01) |

(52) U.S. Cl.
CPC .......... *G06F 1/3237* (2013.01); *G06F 1/3209* (2013.01); *G06F 1/3296* (2013.01); *H04W 52/0229* (2013.01); *H04W 52/0235* (2013.01)

(58) Field of Classification Search
None
See application file for complete search history.

(56) References Cited

U.S. PATENT DOCUMENTS

| 5,931,951 | A | * | 8/1999 | Ando | .................. G06F 12/0891 |
| | | | | | 713/400 |
| 6,577,608 | B1 | * | 6/2003 | Moon | .................... H04B 1/707 |
| | | | | | 455/343.1 |
| 9,477,292 | B1 | * | 10/2016 | Murali | .............. H04W 52/0235 |
| 2014/0281658 | A1 | * | 9/2014 | Kelly | ........................ G06F 1/10 |
| | | | | | 713/502 |

(Continued)

*Primary Examiner* — Danny Chan
(74) *Attorney, Agent, or Firm* — File-EE-Patents.com; Jay A. Chesavage (57) ABSTRACT

A communications processor is operative in a plurality of modes including at least a high performance mode, a power savings mode with lower computational capability, and a shutdown mode with a wakeup capability. A memory for the communications processor has a high speed segment and a low speed segment, the high speed segment and low speed segment respectively on a high speed data bus and a low speed data bus, the high speed data bus and low speed data bus coupled by a bidirectional bridge.

20 Claims, 6 Drawing Sheets

(56) References Cited

U.S. PATENT DOCUMENTS

2017/0045923 A1\* 2/2017 Horikoshi ............. G06F 9/4406

\* cited by examiner

*Figure 1*
Prior Art

*Figure 3*
Clock Module

*Figure 4*
Power Module

*Figure 5B*

METHOD AND APPARATUS FOR SELECTABLE HIGH PERFORMANCE OR LOW POWER PROCESSOR SYSTEM

FIELD OF THE INVENTION

The present invention relates to an architecture for computing. In particular, the invention provides an architecture for tradeoff of computational power with power consumption in a manner which is discretely selectable through several incremental steps from a sleep state to a power saving computational state to a high performance state.

BACKGROUND OF THE INVENTION

Certain applications such as wireless signal processing involve intervals of time when computationally intensive performance is required, such as during the reception and processing of wireless packets, where the processor may be performing "lower MAC" (media access controller) or security (encryption) protocols such as key generation performed by software. At other times, such as when waiting for the reception of a packet, it is preferable for the processor to be in a low power mode with processing tasks which require much less power. For battery powered systems, the frugal use of power is critical for prolonging battery life.

Figure 1:
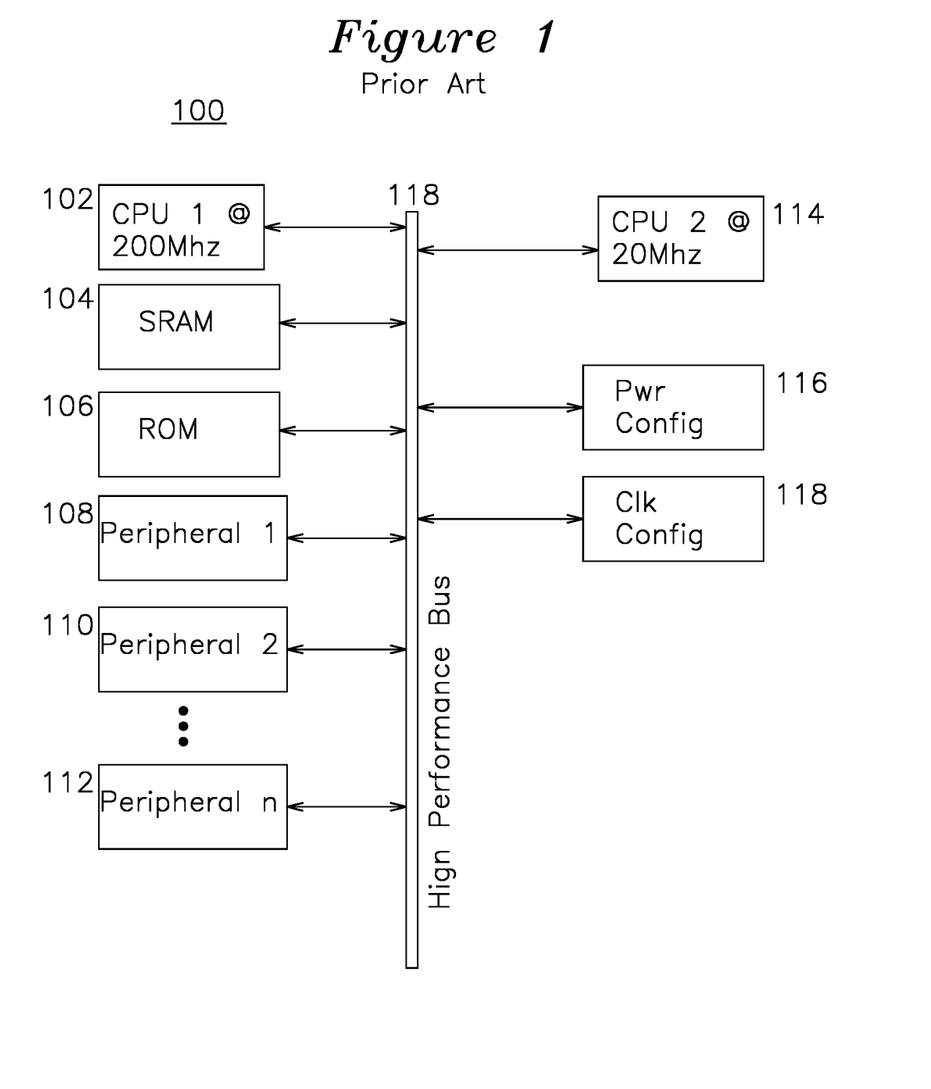
FIG. 1 shows a block diagram for a prior art processor subsystem using two CPUs to provide either high performance or low power consumption.

FIG. 1 shows an example prior art system 100 which provides low power consumption with associated low performance by using CPU 2 114, and using CPU 1 102 with higher performance and accordingly higher power consumption than CPU 2 114. Each low power consumption (with lower performance) CPU 114 and high performance (with higher power consumption) CPU 102 is separately enabled, and each CPU 102 or 114 is coupled to associated peripherals via high performance bus 118, with the high performance CPU 102 disabled during low power intervals when computationally intensive processing is not scheduled to be done, and where CPU 102 is enabled during high performance intervals with the companion power saving CPU 114 disabled.

An example processor with a multi-performance capability is the System On a Chip (SOC) model PSOC® 63BL by Cypress, which has a 150 Mhz Cortex M4 CPU 102 operative using a first instruction set, and also a Cortex M0 CPU 114 which is operative with a different instruction set (generally a subset of the Cortex M4 instruction set, but which requires a separate compilation and generates a separate executable code image for execution by each respective processor). Accordingly, one disadvantage is that the CPU1 processor 102 and CPU2 processor 114 require independent sets of executable code, which increases storage ROM and executable code RAM requirements. Because of the two-processor development, it becomes complex to develop code for two environments, and also requires additional code storage for the second processor. Another disadvantage is that the single high performance bus 118 consumes power associated with high performance operation during both high performance and low power operation.

One metric for multi-core processors having a high performance and power savings mode is the power consumption per clock speed, commonly expressed in the units uA/Mhz. For example, the M0 core for the above example processor is advertised as consuming 40 uA/Mhz when using the M4 core, and 26 uA/Mhz when using the M0 processor, about a factor of 1.5 reduction in power consumption between high performance and low power modes for a given clock rate.

It is desired to provide a processor system suitable for realization onto a single silicon chip which has a high performance mode and a low power mode, and which provides several steps of performance capability and power consumption increments so it may be tailored to the particular applications and tasks being executed. It is further desired to provide a single processor operative on a single executable instruction set and single code image which provides a continuity of performance and power consumption.

OBJECTS OF THE INVENTION

A first object of the invention is a processor system having selectable levels of performance and power consumption over several intermediate steps.

A second object of the invention is a processor system having a single CPU operative at high speed or at low power consumption, the processor system having a high speed bus for high performance transactions, a low power bus for low power consumption during comparatively low performance transactions, a clock distribution bus having high frequency precise clock outputs and low power clock outputs with comparatively less precision, and a power distribution bus for providing adjustable voltage levels to devices which have programmable performance capability associated with different voltage levels.

A third object of the invention is a processor system having a single CPU operative at different voltages and frequencies, the single CPU coupled to a high speed bus for high performance operations and a low speed bus for low power consumption operations, the processor system having a bridge coupled between high speed bus and low speed bus for passing transactions bidirectionally, a high performance Random Access Memory (RAM) coupled to the high speed bus and also accessible to low speed peripherals via the bridge and also accessible to high speed peripherals via the high speed bus.

A fourth object of the invention is an SRAM having a large segment for high speed operations and a comparatively small segment for low power operations, both coupled to a CPU having a dual high performance mode and low power mode, the large segment of the SRAM enabled for high performance mode and the small segment of the SRAM enabled for low power mode, the CPU operative at a higher voltage and higher clock frequency in a high performance mode than in a low power mode.

SUMMARY OF THE INVENTION

A system on a chip (SOC) integrated circuit has a single CPU which is operative at a plurality of voltages and a plurality of clock rates, each voltage and clock rate associated with an incremental performance level which is set through a performance register. The CPU is coupled to a high speed bus and a low power bus which provide high performance operation and low power operation, respectively. A clock distribution bus has a plurality of different clock sources and clock types that are enabled depending on the value stored in the performance register, those distributed clocks include a high precision low phase noise oscillator source, a Phase Lock Loop (PLL) source having an input coupled to the oscillator, a ring oscillator (RO) with greater frequency variation but lower power consumption than the high precision oscillator source, and an RC oscillator for low power and low frequency use by peripherals. The performance register value also selects the type of power sources coupled to a power distribution bus. In one example of the invention, the performance register at different times has values associated with a sleep mode (PS0), a standby mode (PS1), a low power mode (PS2), a medium performance mode (PS3), and a high performance mode (PS4), where each mode has associated CPU voltage and frequency, a selection of whether the high speed bus or low power bus is enabled, separately enabled clock sources and types, and high speed SRAM or low power SRAM which can be enabled.

In contrast with the power consumption metrics of the prior art, where the M4 metric is 40 ua/Mhz reducing to 26 ua/Mhz for M0 processor at 1.1 v, or for 0.9 v, the M4 metric is 26 uA/Mhz dropping to 17 uA/Mhz for the M0 core, the architecture of the present invention in a low power operational mode draws less than 12 uA/Mhz and as low as 6-7 uA/Mhz, while still using the same M4 processor core of the prior art but with the power saving architecture of the present invention. Where the prior art is capable of a 1.5× reduction in uA/Mhz from high performance to low power mode for a given configuration, the present invention provides more than a 3× reduction with the same configuration.

DETAILED DESCRIPTION OF THE INVENTION

Figure 2A:
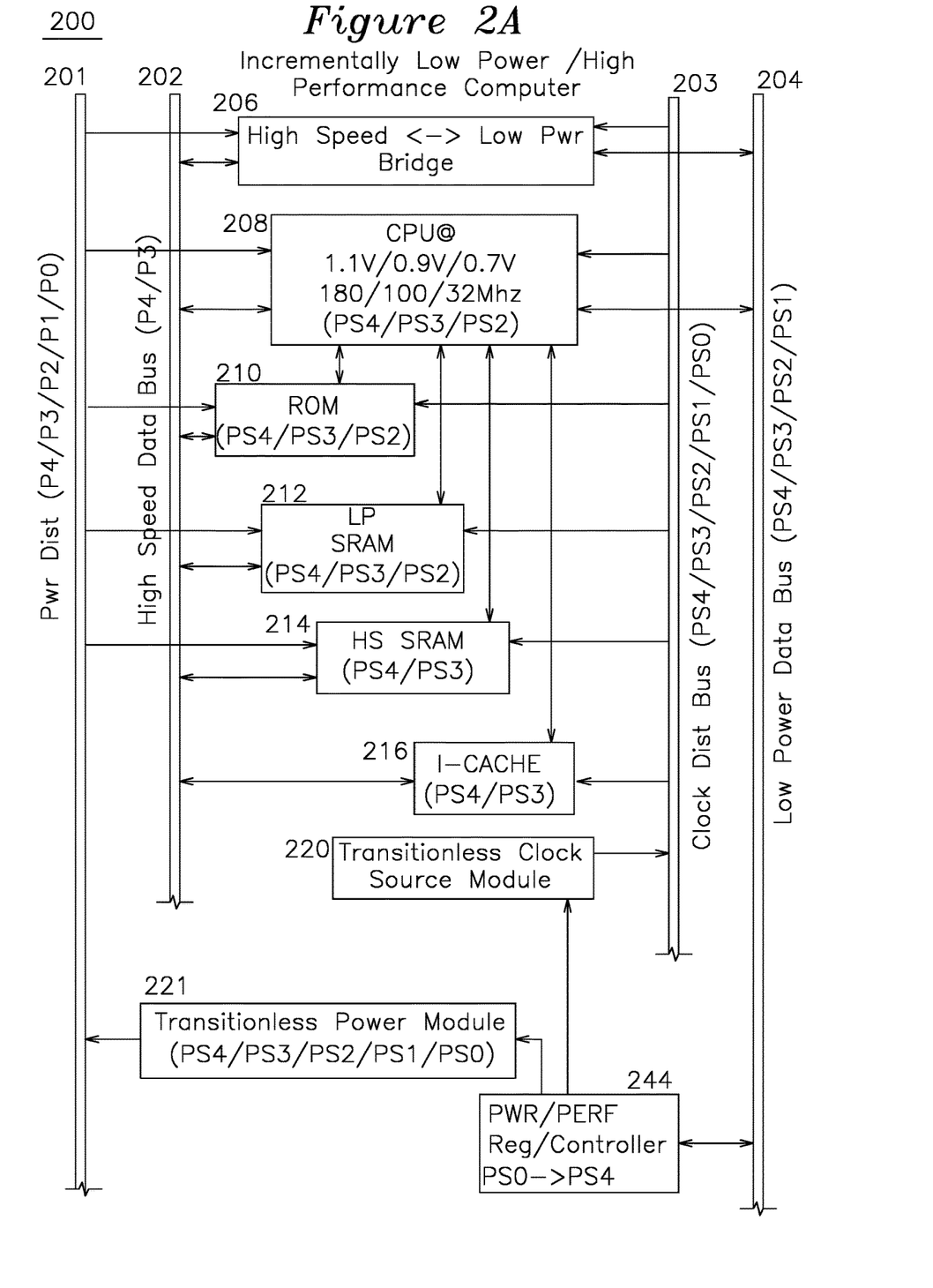
FIGS. 2A and 2B show block diagrams for an example communications processor according to one aspect of the invention.
Figure 2B:
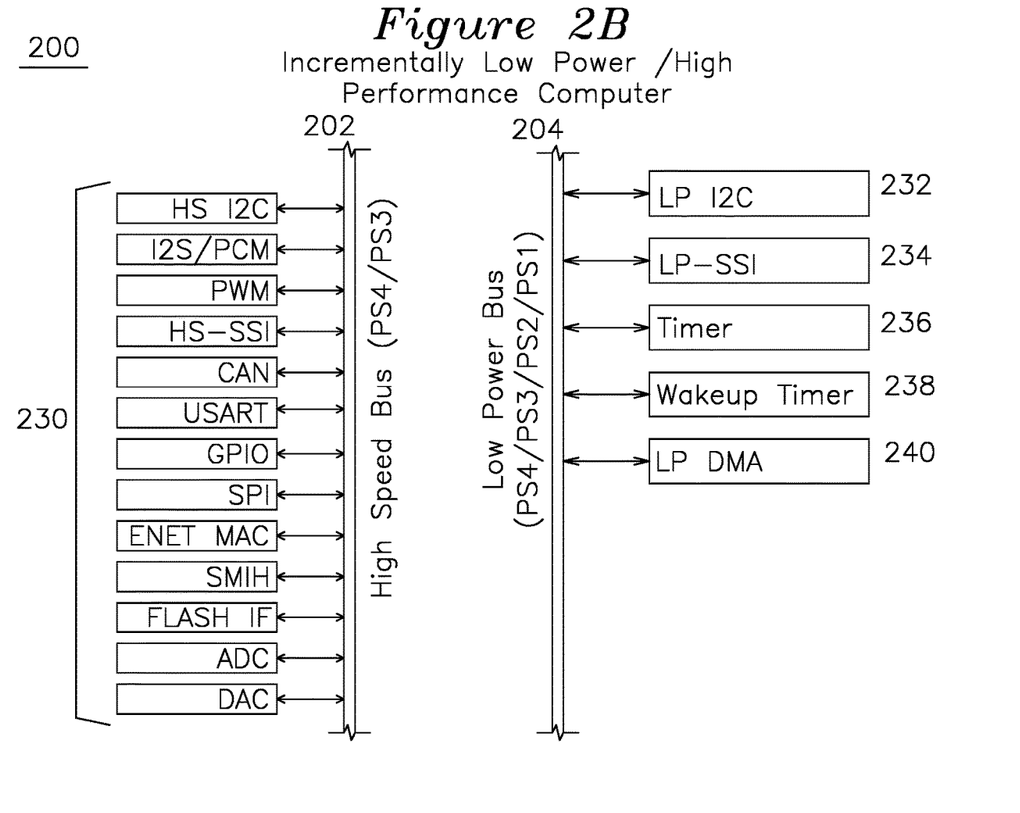
Figure 2C:
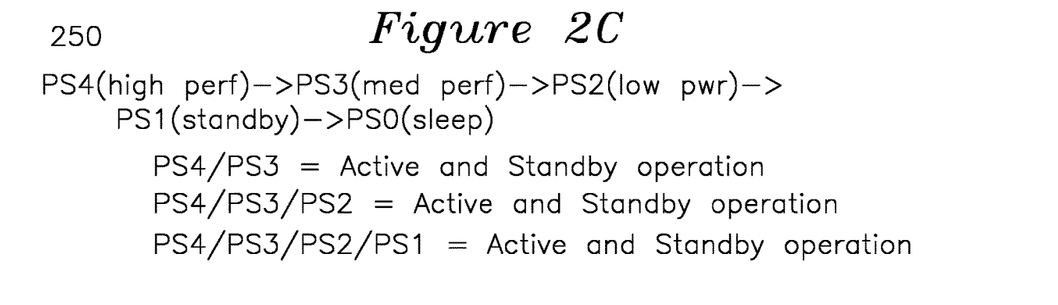
FIG. 2C shows an example performance register and associated operational modes and assignments.

FIG. 2A shows a block diagram of an example variable performance single chip processor 200. A Central Processing Unit (CPU) 208 provides functionality including instruction fetch and execution, and read and write operations on several different interfaces. In one example embodiment, the CPU 208 is a variable clock speed processor having the Cortex M4 processor instruction set and coupled to a high speed bus 202 and also a low power bus 204. A performance register 244 provides for a variety of different discrete levels of performance or power savings as shown in the states of FIG. 2C. In the example available settings for performance register 230 shown in FIG. 2C, the performance register 250 has five values, including PS0 (sleep mode), PS1 (standby mode), PS2 (low power operational mode), PS3 (medium performance), and PS4 (high performance).

The operation of the processor 200 is hierarchical with respect to performance register levels PS0 through PS4, where each associated performance level has an associated set of hierarchical capabilities. These hierarchical capabilities are provided by the performance register, which associates groups of configurable hardware parameters with the discrete set of performance register values such as PS0 to PS4 in the present example. Each performance register level has associated hardware parameters, such as clock speeds and voltages associated with each of the PS0 to PS4 states, as well as clock source selection, such as the use of phase lock loop (PLL) for frequencies equal to or over 100 Mhz such as PS4 CPU clock speed of 180 Mhz. There may be multiple PLLs which are enabled for performing clock distribution for modes other than sleep mode, standby mode, or low power mode, and the PLLs may select from a variety of sources depending on performance mode. A power saving clock source may be a resistor-capacitor (RC) oscillator for low power and low frequency performance modes such as sleep mode or standby mode, and for low performance mode with higher clock frequencies, a ring oscillator (RO) may be used, and for yet higher frequencies, a crystal oscillator (XTAL) clock source may be used. The PLL based clock source is preferably used with CPU clock rates of 180 Mhz, 150 Mhz, and 100 Mhz, whereas in power saving modes, the RO, RC clock sources may be used in combination with a clock doubler rather than a PLL, each combination of clock source and doubler having a lower power dissipation than a PLL.

CPU 208 is also operative at different voltages, for example each CPU voltage associated with a different maximum clocking rate, power consumption, and each of performance register values PS1 through PS4. Typically, a CPU operating at a higher voltage is capable of faster clock speeds and performance, drawing more power in that state than operating at a lower voltage and lower clock rate. In the present example, the CPU is operative at 1.1V, 0.9V, and 0.7V, with corresponding clock rates 180 Mhz, 100 Mhz, and 32 Mhz. The CPU 208 is coupled to a high speed bus 202 and a low speed bus 203. Each respective bus 202 and 203 is coupled to peripheral devices with corresponding high performance or low power capabilities. FIG. 2B shows some example peripheral devices 230 connected to the high speed bus 202, including a high speed I2C interface, a PCM (Pulse Code Modulation) interface, a pulse width modulator (PWM) for generating variable duty cycle pulses, a Synchronous Serial Interface (SSI) interface, a Controller Area Network (CAN) bus interface, a universal synchronous/asynchronous receiver-transmitter (USART), general purpose IO (GPIO), a Small Peripheral Interface (SPI), an ethernet media access controller (MAC), an SMIH interface, a flash memory interface, an analog to digital controller (ADC), and a digital to analog controller (DAC). The devices on high speed bus 230 are typically critical for completing processing in a comparatively urgent interval of time compared to the peripherals coupled to the low power bus 204, including Low Power I2C (LPI2C) 232, timer 238, wakeup timer 238, and LP DMA 240 for low speed transfers.

For example, a wireless media access controller (MAC) may be coupled to the high speed bus 202 to provide high speed transfers of data, whereas a packet energy detector (envelope detector) may be coupled to the low power bus for use when the computer is in a low power mode periodically sampling the RF envelope to detect start of packet, as described in issued U.S. Pat. No. 9,477,292.

CPU Frequency/Voltage vs Power State

| Power State | CPU Clk | CPU Core Vss | Pwr Efficiency |
|---|---|---|---|
| PS4 | 180 Mhz | 1.1 V | 36 uA/Mhz |
| PS3 | 100 Mhz | 0.9 V | |
| PS2 | 32 Mhz | 0.7 V | 12 uA/Mhz |
| PS1 | | | |
| Standby | | | |
| Sleep | | | |
| PS0 | | | |

The CPU 208 is directly coupled to Read Only Memory (ROM) 210 using a typical interface bus such as Serial Peripheral Interface (SPI), which may also be used for interconnections to the high speed bus 202 and low power bus 204.

The static random access memory (SRAM) is separated into a low power (with the tradeoff of being smaller in size and having low performance) SRAM 212 and a larger high speed SRAM 214, the low power SRAM 212 having slower speed and lower power consumption than the high speed SRAM 214. Both the low power SRAM 212 and high speed SRAM 214 are coupled to the high speed bus 202 as well as the low power bus 204 through respective interfaces. The low power SRAM 212 preferably stores subsequently read data low speed values during PS0 and PS1 modes for later use by the CPU in a wakeup mode PS2, PS3, or PS4, rather than executable code for use by the CPU 208. Examples of such low speed low power data are the output samples of an RF energy sampling device which are placed in low power SRAM 212 by a state machine which is active when the CPU is in a sleep or powerdown state. Periodically, the CPU may wake up and search for network activity as evidenced by measurement of previously saved RF energy sample values, such as by using the apparatus and method of the wireless receiver wake-up detector of U.S. Pat. No. 9,477, 292. The low power SRAM 212 has 2 KB banks which are individually activated, thereby reducing the power requirement of an SRAM with larger blocks in a low power mode, and the SRAM 212 has a long access time for additional power savings. By contrast, the high speed SRAM 214 has larger block sizes (such as 8 KB banks or 16 KB banks), and is fast enough for use in storing executable code for execution by CPU 208. In a powersave mode where the CPU 208 is disabled and a peripheral such as an external amplitude detector examining energy level samples using the wakeup method of U.S. Pat. No. 9,477,292 which writes these values into the low power SRAM 212, where the SRAM 212 is functioning primarily for data retention, the data being read later by the CPU 208 upon a wakeup event or other wake-from-sleep external trigger or event.

The performance controller 244 is always operative in all power states, and includes a power controller with a finite state machine (FSM) which controls the migration of the hierarchy of power, clocks, and clock distribution as they switch between higher and lower power modes, such as those shown in the continuum of FIG. 2C. When the CPU 208 has been disabled, the performance controller also controls the same hierarchy when a power-up state is requested such as by a timed interrupt or external event. When the CPU 208 is started and executing, it has control over the performance register of power controller 244, and can change power consumption and performance level.

One feature of the hierarchy is that high performance peripherals are available in some states (PS3 and PS4) and not in others (PS0, PS1, PS2).

An instruction cache 216 is used by the processor 208 for cached instructions, such as repeating instruction loops and the like.

The power management system 221 of power distribution bus 201 comprises combined 222 low dropout DC-DC regulator and low drop-out linear regulator for generation of 1.8V for Input/Output (I/O) drivers and with 1.1V used for core voltages of the CPU 208. As DC-DC regulators tend to be inefficient at lower currents, a low dropout linear regulator 224 is used for those low power subsystems. A DC-DC converter 226 may generate 1.35V for high performance systems as required. The performance register 230 is operative to select particular combinations of power distribution systems of FIG. 4 according to the performance register value, where voltage outputs with low current requirements (for sleep, standby, and low power operation) are provided by low dropout linear regulators, and voltage outputs with higher current requirements (for medium and high performance) are DC-DC converters with associated higher current capability.

The clock distribution bus 203 is coupled to a clock module 220 which provides a variety of programmable clock sources for the CPU 206, SRAM 212, 214, and other subsystems and peripherals requiring a clock source. The clock distribution bus 203 provides clocking at various rates, depending on performance register 230 setting. As before, the clock distribution bus 203 is operative from the performance register 244, so may use a low frequency RC oscillator to the clock bus 203 in combination with a lower voltage to the CPU 206 for power savings. As the performance register has values updated to provide higher levels of performance required by the underlying task, the performance register is written by the CPU to a higher performance level (PS2 to PS3 to PS4), the CPU voltage is increased with the CPU clock speed to increase performance. Conversely, during intervals of decreased task complexity, the performance register has values updated to provide lower levels of performance and greater power savings (such as PS4 to PS3 to PS2) with CPU clock speed and voltage decreased accordingly. By having separate control of each aspect of performance, it is possible for the processor system to rapidly and incrementally adjust capability to the size of the current and upcoming task or process. Each clock source has performance which is associated with a power consumption, such that the required performance is met for each task while providing optimum power savings.

Figure 3:
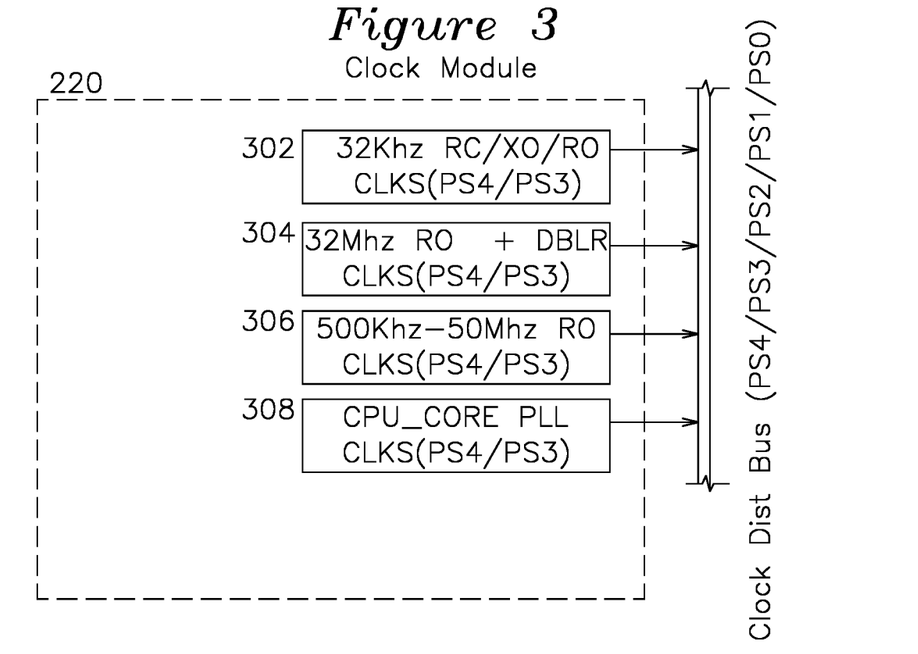
FIG. 3 shows details of the clock module of FIG. 2A.

FIG. 3 shows a clock module 220 of FIG. 2A and a plurality of clock sources, each of which has a particular frequency range, power consumption, and accuracy/stability. The 32 Khz clock source 302 provides a 32 kilohertz source selected from a Ring Oscillator (RO) consuming <5 nA but having the lowest accuracy, a Resistor/Capacitor (RC) oscillator consuming <100 nA also with poor accuracy but high frequency capability such as 32 Mhz, or a crystal oscillator (XO) with highest accuracy and highest power consumption ~100 nA. The crystal oscillator may be used to calibrate the RO by providing a calibration value. For example, the crystal oscillator may be used to count the number of cycles in a given time T output by the RO or RC, and that value used for measurement of T for use in a wakeup counter, for example.

A 32 Mhz RC oscillator 304 provides a CPU and peripheral clock with power consumption of <70 nA, and may be used with a frequency doubler (not shown) to generate 64 Mhz.

A High Frequency Ring oscillator 306 is a separate clock source available for outputting frequencies in the range of 500 kHz-50 Mhz, with a typical power consumption of 34 uA at 75 Mhz, 6 uA as 12 Mhz, and 475 nA at 500 Khz.

A phase locked loop 308 is available for synthesizing system clocks, as required during initial filming.

Figure 4:
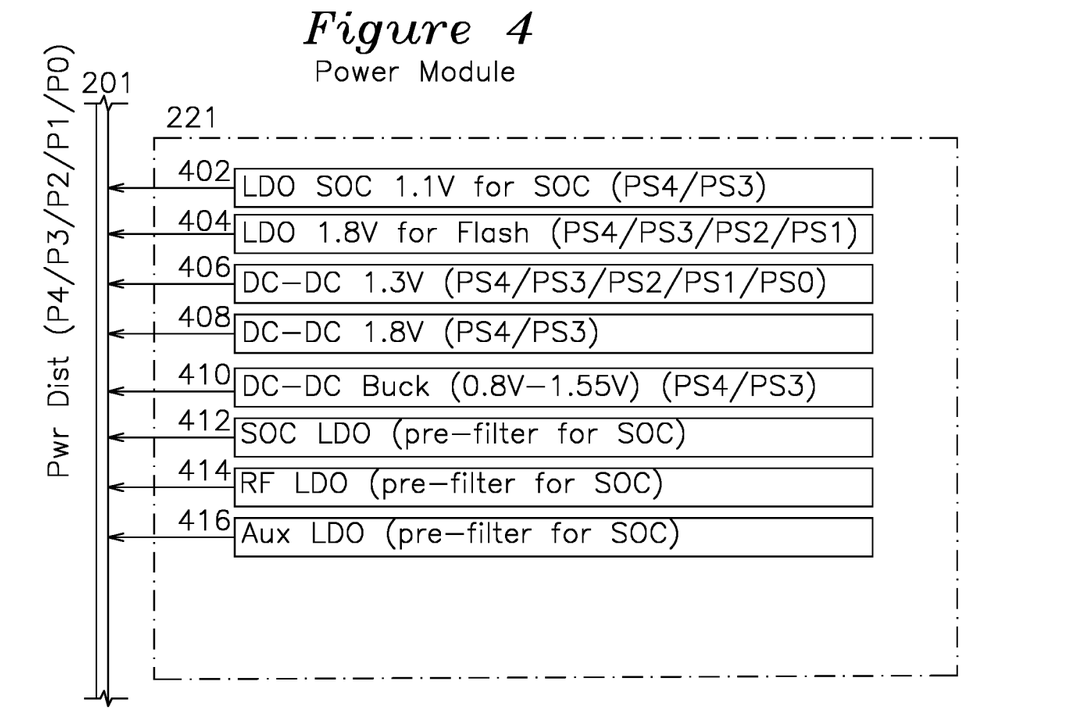
FIG. 4 shows details of the power module of FIG. 2A.

FIG. 4 shows a power module, which provides a low dropout (LDO) linear regulator 402 for 1.1V for use in PS3 and PS4 power states. LDO regulator 404 provides 1.8V for flash memory, and is used in power states PS1 through PS4. DC to DC converter 406 is operative to produce 1.3V for the CPU in PS3 and PS4 power states, and DC to DC converter 408 is operative to produce 1.8V for high performance states PS3 and PS4. DC to DC buck converter reduces an applied voltage to the range 0.8V to 1.55V in PS3 and PS4 states, and three additional LDO regulators 412, 414, 416 pre-filter voltages applied to various other subsystems. Each of the power modules of FIG. 4 is operative for a particular power state.

Figure 5A:
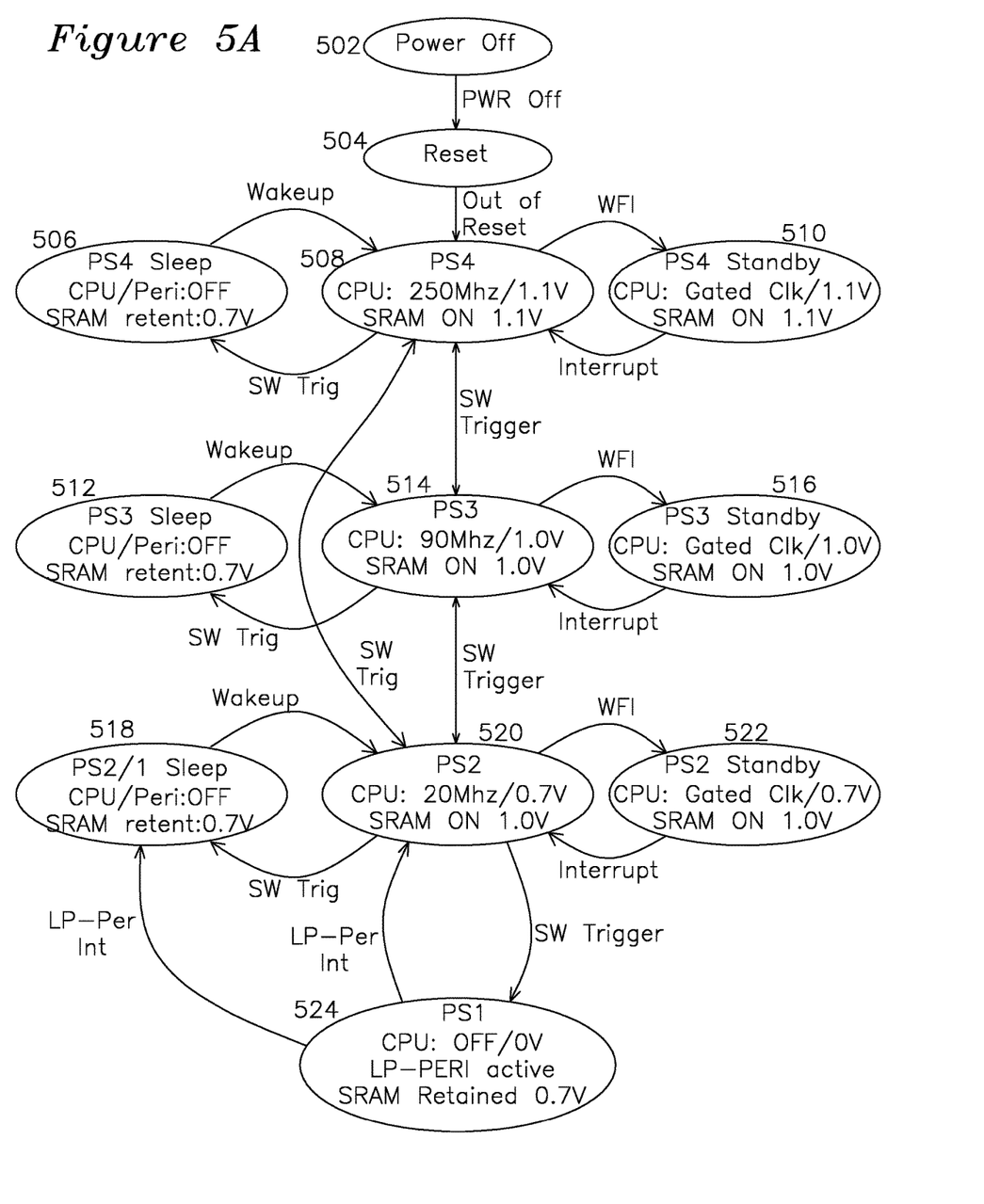
FIGS. 5A and 5B show power state diagrams for transitioning from high performance to low power states.
Figure 5B:
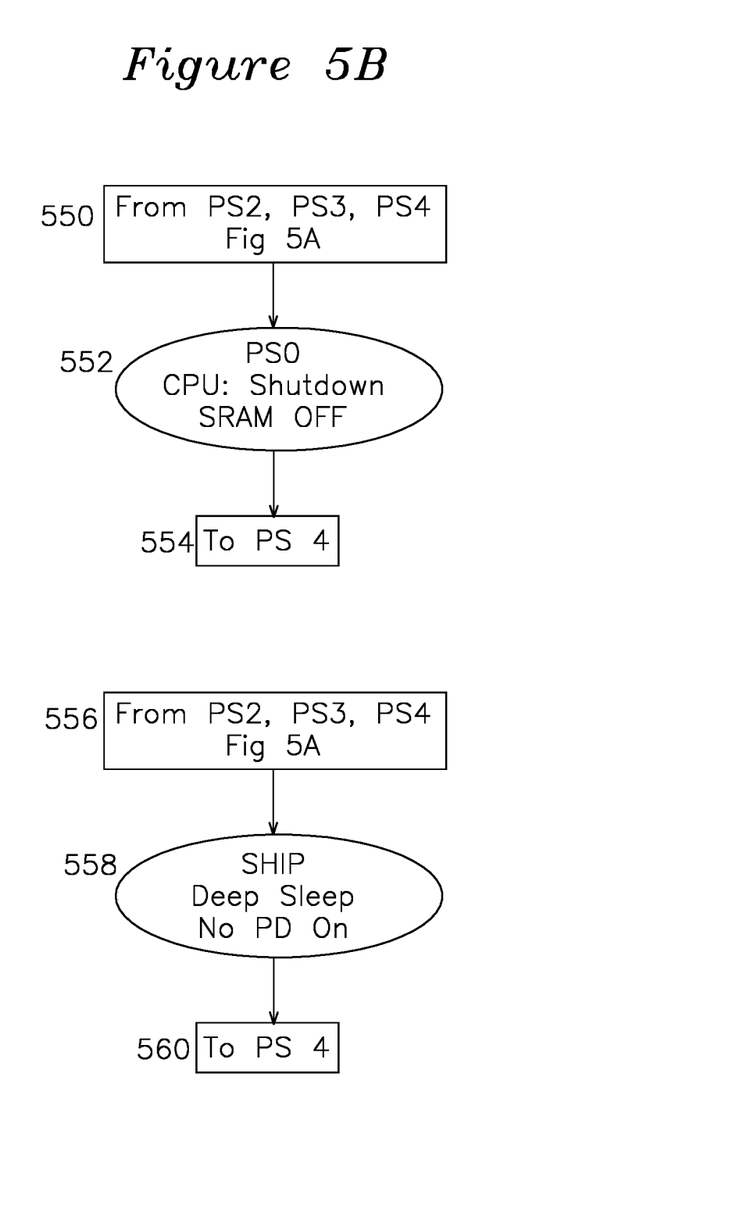

FIGS. 5A and 5B show a diagram for power state transitions associated with those shown in FIG. 2C, providing orderly movement from one power state to another. 502 is a power off initial state, application of power moves the system to a reset state 504, thereafter to PS4 with an example CPU clock speed of 250 Mhz and 1.1V applied from supply 404. Suspension of activity results in the system moving to PS4 standby 510, where the CPU clock is simply gated off, whereas transition from 508 to a sleep mode 506 results in the CPU and peripheral voltage removed but with the SRAM voltage reduced to 0.7V for retention. The executable code writing to a power state register 244 of FIG. 2A results in the power state changing from high performance PS4 to greater power savings state PS3 514 with reduced performance results in the CPU clock rate to an example 90 Mhz with an example CPU voltage of 1.0V. Similarly, a WFI event can cause the power state to migrate to PS3 Standby with the CPU on a gated clock, or to a PS3 sleep mode with power removed from the CPU and SRAM retention voltage applied. Migration to yet lower power state PS2 520 may occur by writing to the power state register 244, where the CPU frequency is now 20 Mhz with a CPU voltage of 0.7V and an SRAM voltage of 1.0V. As before, PS2 standby state 522 is available with assertion of WFI, or PS2/1 sleep state 518 by writing to the power state register. PS1 524 is a yet lower state where only the low power peripheral bus is active with SRAM powered to 0.7V for low speed performance only. The system can migrate from PS1 to PS2 on an interrupt, or it can migrate to PS2/PS1 sleep state 518 on an interrupt from the low power peripheral bus. FIG. 5B shows that the PS0 shutdown state 552 is available to active states PS2, PS3, and PS4, with the system returning to PS4 on command, and also notes that a deep sleep state SHIP is available to PS2, PS3, and PS4, which may exit thereafter to PS4.

In the present patent description, "approximately" is understood to be in the range from ½ to 2× the nominal value.

We claim:

1. A processor comprising:
   a central processing unit (CPU);
   a performance controller having a performance register, the performance register having a plurality of values associated with incrementally increasing performance and incrementally increasing power consumption;
   a high speed bus coupled to a low power static random access memory (LPSRAM), a high speed static random access memory (HSSRAM), and to the CPU;
   a low speed bus coupled to the CPU and the performance register;
   a bridge coupling the high speed bus to the low speed bus;
   the performance controller, for each discrete value of performance register, associating a CPU voltage from a CPU voltage source, a CPU clock speed from a CPU clock source, and enabling or disabling the LPSRAM and HSSRAM;
   the low speed bus coupled to an RF energy detector periodically storing samples of RF energy level into the LPSRAM, wherein an increase in the RF energy level of the samples causes the performance controller to change a value in the performance register to a higher performance level.

2. The processor of claim 1 where increasing a value in the performance register causes the CPU voltage and CPU clock to increase in sequence from approximately 0.7V and approximately 32 Mhz to approximately 0.9V and approximately 100 Mhz, or to approximately 1.1V and approximately 180 Mhz.

3. The processor of claim 1 where at least one of the performance register values provides a reduced HPSRAM or LPSRAM voltage for retention of data but where the reduced voltage does not provide for reading or writing data.

4. The processor of claim 1 where said CPU is coupled to a clock source which is at least one of a ring oscillator (RO) or a resistor/capacitor (RC) oscillator for a low power performance register value and a phase locked loop (PLL) oscillator for a high performance mode.

5. The processor of claim 1 where the performance register has values of PS0, PS1, PS2, PS3, and PS4, where, in sequence, each value provides greater power consumption and greater performance.

6. The processor of claim 5 where the performance register value of PS0 corresponds to a sleep mode.

7. A processor comprising:
   a central processing unit (CPU);
   a performance register having a plurality of values associated with incrementally increasing processor performance and incrementally increasing processor power consumption;
   a high speed bus coupled to a low power static random access memory (LPSRAM), a high speed static random access memory (HSSRAM), and to the CPU;
   a low speed bus coupled to the CPU and to the performance register;
   a bridge coupling the high speed bus to the low speed bus;
   the performance register, for each value, associating a CPU voltage from a CPU voltage source, a CPU clock speed from a CPU clock source, and enabling or disabling the LPSRAM and HSSRAM;
   the performance register having a sleep mode value associated with a minimum power consumption;
   the low speed bus coupled to an RF energy detector periodically storing samples of RF energy level into the LPSRAM when the performance register contains the sleep mode value, wherein an increase in the RF energy level of the samples causes the performance register to change to a higher performance level.

8. The processor of claim 7 where increasing the value in the performance register causes the CPU voltage and CPU clock to increase in sequence from approximately 0.7V and approximately 32 Mhz to approximately 0.9V and approximately 100 Mhz, or to approximately 1.1V and approximately 180 Mhz.

9. The processor of claim 7 where at least one of the performance register values provides a reduced HPSRAM or LPSRAM voltage for retention of data but where the reduced voltage does not provide for reading or writing data.

10. The processor of claim 7 where said CPU is coupled to a clock source which is at least one of a ring oscillator (RO) or a resistor/capacitor (RC) oscillator for a low power performance register value and a phase locked loop (PLL) oscillator for a high performance mode.

11. The processor of claim 7 where said performance register has values of PS0, PS1, PS2, PS3, and PS4, where, in sequence, each value provides greater power consumption and greater performance.

12. The processor of claim 7 where the performance register is configured to detect a performance level and change a value in the performance register to a value associated with a higher performance level when a higher performance level is required, and change a value in the performance register to a value associated with a lower performance level when a lower performance level is required.

13. A processor comprising:
a central processing unit (CPU);
a performance register having a plurality of states, each state associated with a particular level of performance and power consumption;
a performance register controller configured to dynamically adjust the performance register;
a processor clock source having an output coupled to the CPU and having a frequency controlled by the performance register;
a voltage source coupled to the CPU, the voltage source controlled by the performance register, each voltage coupled to the CPU also associated with the a minimum voltage required to ensure operation of the CPU at each particular clock frequency selected by the performance register;
a high speed bus coupled to the CPU, the a high speed RAM, and also to a low power RAM;
a low power bus coupled to the CPU and also coupled to the performance register, the low power bus also coupled to a packet energy detector periodically sampling an RF energy level and storing the samples in a low power static random access memory (LPSRAM);
a bridge coupling between the high speed bus and low power bus;
the processor clock source comprising at least one of a ring oscillator or resistor/capacitor (RC) oscillator enabled for a low power state and a PLL enabled for a high performance state;
the CPU periodically waking up from a power savings mode and examining the stored samples, the CPU changing the performance register to a higher performance state when an increase in RF energy level is detected in the stored samples.

14. The processor of claim 13 where the power savings mode is a sleep mode during which the high speed bus is disabled and the voltage source selects a minimum voltage compared to other voltage source settings.

15. The processor of claim 13 where the power savings mode is a sleep mode with the clock source outputting a minimum clock frequency compared to other clock source frequencies.

16. The processor of claim 13 where the controller is operative to detect a timed interrupt or external event to change the performance register state.

17. The processor of claim 13 where the performance register states includes at least one of: a sleep state, a standby state, and low power operation state.

18. The processor of claim 16 where the performance register is written by the CPU.

19. The processor of claim 13 where a wireless media access controller (MAC) is coupled to the high speed bus.

20. The processor of claim 13 where the low power RAM operates at a reduced voltage for data retention when the performance register state is a sleep state.

* * * * *